United States Patent [19]

Heesemann

[11] Patent Number: 5,789,829
[45] Date of Patent: Aug. 4, 1998

[54] MOTOR CONTROL SYSTEM MOUNTED ON A MOTOR CASING

[76] Inventor: Juergen Heesemann, Bessinger Str. 27, 32547 Bad Oeynhausen, Germany

[21] Appl. No.: 321,892

[22] Filed: Oct. 17, 1994

Related U.S. Application Data

[63] Continuation-in-part of Ser. No. 946,430, filed as PCT/DE92/00211, Mar. 13, 1992, abandoned.

[30] Foreign Application Priority Data

Mar. 13, 1991 [DE] Germany .................. 41 08 074.2

[51] Int. Cl.$^6$ ............................................. H02K 9/00
[52] U.S. Cl. ..................... 310/52; 310/51; 310/60 A; 310/67 R
[58] Field of Search .................. 310/68 D, 40 R, 310/219; 318/17, 254

[56] References Cited

U.S. PATENT DOCUMENTS

| Re. 29,695 | 7/1978 | Blake | 310/87 |
|---|---|---|---|
| 3,667,692 | 6/1972 | Grace | 241/36 |
| 3,885,175 | 5/1975 | Palloch | 310/68 D |
| 3,911,300 | 10/1975 | Lebkuchner | 310/86 |
| 4,072,872 | 2/1978 | Gleichman | 310/53 |
| 4,238,689 | 12/1980 | Breslin et al. | 307/42 |
| 4,339,231 | 7/1982 | Conery et al. | 417/40 |
| 4,510,404 | 4/1985 | Barrett et al. | 310/50 |
| 4,668,898 | 5/1987 | Harms et al. | 318/254 |
| 4,808,865 | 2/1989 | King | 310/71 |
| 4,847,513 | 7/1989 | Katz et al. | 307/149 |
| 4,857,812 | 8/1989 | Mochizuki et al. | 318/15 |
| 4,885,440 | 12/1989 | Kachuk | 310/68 E |
| 4,892,464 | 1/1990 | Schydlo | 417/201 |
| 5,130,616 | 7/1992 | Owen | 318/17 |
| 5,223,770 | 6/1993 | Schlessmann | 318/17 |
| 5,327,064 | 7/1994 | Arakawa et al. | 318/801 |

FOREIGN PATENT DOCUMENTS

| 21 05 382 A1 | 8/1972 | Germany . |
|---|---|---|
| 29 37 480 A1 | 4/1981 | Germany . |
| 87 04 712 U | 11/1987 | Germany . |
| 86 02 197 U | 12/1988 | Germany . |
| 90 17 681 U | 11/1991 | Germany . |

Primary Examiner—David S. Martin
Attorney, Agent, or Firm—Foley & Lardner

[57] ABSTRACT

A motor control system with a motor having an essentially cylindrical casing and a control system having a processor and power control elements. The control system generates the driving current for the motor based on an external command signal fed to the control system, transmits the driving current to the motor via a line, and receives signals which indicate the status of the motor. The control system is mounted directly on a housing. The housing is connected to the casing by narrow webs bridging the air interspace formed between the casing of the motor and the housing of the control system, thereby mitigating mechanical and thermal influences of the casing of the motor and the housing.

16 Claims, 2 Drawing Sheets

MOTOR CONTROL SYSTEM MOUNTED ON A MOTOR CASING

This application is Continuation-in-Part of application Ser. No. 07/946,430, filed as PCT/DE92/00211 Mar. 13, 1992, now abandoned.

FIELD OF THE INVENTION

This invention relates to a controlled motor having a control system which, by means of a processor stage and power control elements, generates a driving current for the motor windings as a function of at least one external command signal fed to the control system and transmits it to the motor via a corresponding line and, possibly, receives signals containing information on the momentary status of the motor.

BACKGROUND OF THE INVENTION

Many such controlled motors are encountered in relatively large machines and installations in which the motors have to safeguard defined drive tasks by means of a master control system. Such motors are, in particular, positioning motors and speed-controlled motors which position tools or the like and drive them in a defined fashion for specific tasks. In the customary technology, the corresponding control systems for the motors are accommodated in control cubicles. The driving currents corresponding to the task in hand are transmitted from the control cubicles to the motors, and information on the momentary status of the motor is fed back regularly to the control cubicle and the master control system contained therein thus enabling control. For this reason, the power currents for the motor windings are transmitted, as are also generally digital signals from rotor position sensors, tacho-generators or other pulse generators, on the connecting lines between the motor and the associated control cubicle. The power currents are likewise frequently transmitted in the form of pulses if, for example, pulse-frequency modulation or pulse-width modulation is selected for dosing the power fed to the motor. Transmission of the different pulse signals produces high-frequency interference signals which can corrupt both the power control system and the measurement information. It is therefore necessary to undertake expensive screening and switching measures in order to avoid interference from being coupled into the lines.

Heat losses which are approximately proportional to a few percent of the received electrical power of the motors controlled are produced in the power control elements, mostly power switching transistors, in the control systems for the motors. In the case of powerful drives and relatively large installations, it is possible as a result for there to be produced in the control cubicle quantities of heat in the region of a few kilowatts which then have to be dissipated via extensive and expensive cooling devices. The outlay hereby produced is further increased if the switching elements in the control cubicle have to be protected against the effects of dust, for example in the operation of woodworking machines.

It is known to transfer command signals to the control system in the control cubicles through a control center. The command signals contain movement information for the individual motors. It is also possible, a the case may be, for operating parameters of the motor, fault signals, etc. to be transferred to the control center via these lines.

SUMMARY OF THE INVENTION

It is the object of the invention to construct controlled motors of the types mentioned above in such a way that operation is possible free from interference and at low cost.

It is another object of the invention to mitigate the detrimental influences (for example, heat transfer from the motor to the control unit and vibrations) of the motor on the control unit attached to the casing of the motor.

This object is achieved by means of controlled motors of the type mentioned above when the control system is mounted in its own housing on the casing of the motor and has at least one input for the external command signal and a supply voltage for generating the driving current.

In a fundamental departure from the prior art to date, the control system is mounted together with its processor stage and the power control elements directly on the motor itself in a separate housing. The control system is fed only a supply voltage which permits generation of the driving current for the motor. Furthermore, the control system is fed an eternal command signal which contains the desired operating parameters for the motor for the respective movement task, for example, moving a tool into a specific position. From the movement task, the intelligent control system generates the driving current for the motor using a technique known per se and transmits the driving current to the adjacent motor on an extremely short line.

It may be seen at once that there are only slight risks of disturbing influences due to the arrangement according to the invention, and therefore screening measures and interference suppression measures can be minimized. In present-day circuit engineering, the control system can be realized in such a small space that the housing for the control system can be favorably mounted on the casing of the motor, for example in an axial extension of the cylindrical casing of the motor.

It is preferable to connect a data line of a master control system to the at least one input of the control system for the external command signal. In this case, the moment command and, possibly, the parameters still required for the movement command can be transmitted via the data line. Information on operating parameters of the motor and any interference can simultaneously be transmitted to the master control system via this data line.

In an alternative embodiment or as a supplement, the controlled motor can be driven independently of a master control system when an input for the external command signal is constructed as a manual input device, so that a movement task can be input directly at the motor itself. In this case, it is expedient when information on the momentary status of the motor, in particular on any possible interference, can be read off on the input device.

In the case of connection of the motor to a master control system via a data line, the data line can also be realized in the form of a supply line for generating the driving current. The data can be transmitted at the supply voltage using circuit engineering known per se.

Although only the power control elements for a motor are accommodated in the housing of the control system, it is frequently necessary, particularly for powerful drives, to provide forced-air cooling for the control system. In the case of powerful drives, the motors are regularly equipped with their own cooling ventilator. The latter can be directly coupled to the motor speed. In a very expedient embodiment, the housing of the control system has ventilation openings communicating with the cooling ventilator of the motor, so that the cooling ventilator of the motor is simultaneously utilized for cooling the control system. Since the control system generates heat losses of the order of magnitude of only a few percent of the heat losses of the motor, this additional thermal load is negligible for the cooling ventilator.

In another embodiment, the speed of the cooling ventilator can be controlled by the processor stage of the control system as a function of the power input of the motor —preferably by means of a temperature measurement at the motor, in particular at the motor windings. If the motor is frequently run in the part-load range, it is possible in this way substantially to reduce the noise pollution due to the motor, which is essentially caused by the cooling ventilator.

In many cases, in particular when the motors have no cooling of their own, it will be expedient for the control system to be provided with its own cooling ventilator.

The major source of heat is the motor itself, and therefore it is desirable to create a thermal insulation so that the heat generated by the electric engine is diverted from the control unit. The housing of the control system should preferably be mechanically decoupled and/or be mounted in a thermally insulating fashion on the casing of the motor. This can be done, for example, by joining the housing of the control system to the casing of the motor via an air interspace bridged by narrow webs. In a preferred arrangement, a cooling ventilator can be arranged in this air interspace.

The power control elements of the control system are preferably mounted on a thermally conductive wall of the housing of the control system which is not adjacent to the casing of the motor, thus preventing thermally-emitting walls of the housing and casing from being opposite one another.

The cooling ventilator of the control system is preferably arranged with its axis of rotation on the longitudinal axis of the generally cylindrical housing. In this case, the cooling ventilator can be arranged on the side of the housing of the control system averted from the motor, the power control elements then being mounted on the wall adjacent to the cooling ventilator, that is to say averted from the casing of the motor.

The controlled motor according to the invention can also be constructed in an explosion-protected fashion, since the casing of the motor and housing of the control system can, in common with the connecting lines between the casing and housing, easily be designed in a pressure-encapsulated fashion.

BRIEF DESCRIPTION OF THE DRAWINGS

The invention is to be explained in more detail below with the aid of exemplary embodiments represented in the drawings, wherein.

DESCRIPTION OF THE PREFERRED EMBODIMENTS

Figure 1:
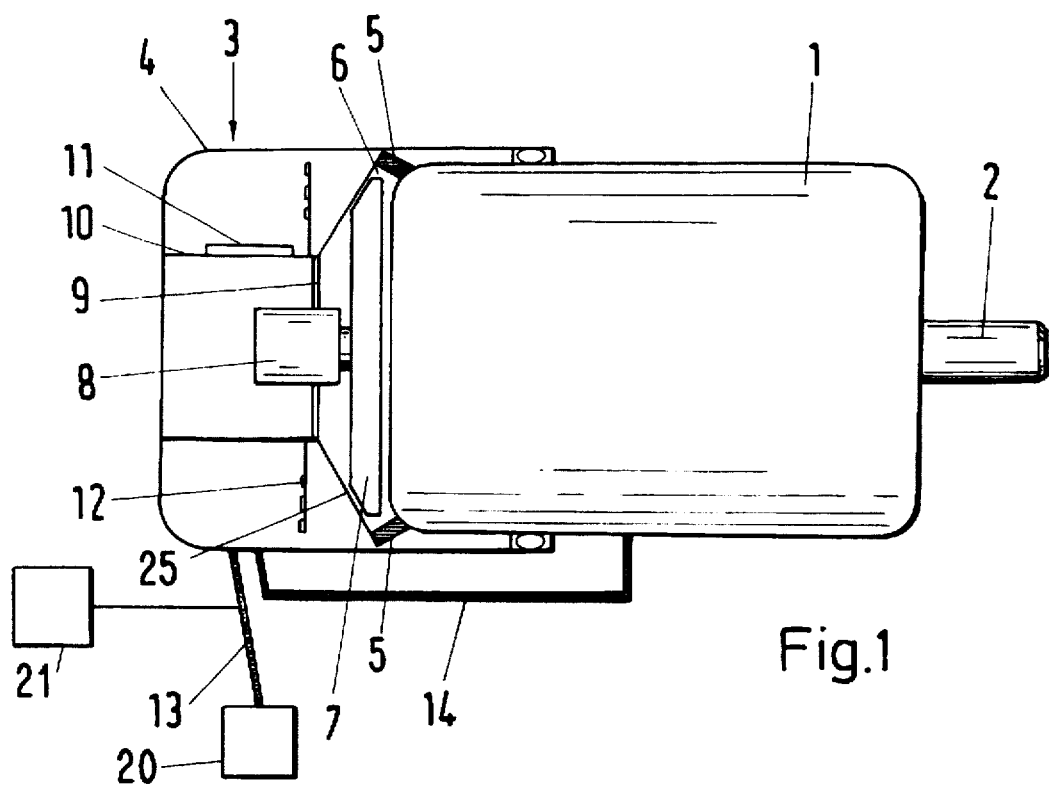
FIG. 1 shows a side a view of a motor having a casing attached over an air interspace, a cooling ventilator being situated in the air interspace.

FIG. 1 illustrates a motor 1 with its drive shaft 2. A control system 3 with a separate housing 4 is attached to such a motor, which can be DC, AC or three-phase motor. The housing 4 of the control system 3 is mounted on the end face via narrow webs 5 on the essentially cylindrically constructed casing of the motor 1 in such a way that an air interspace 6 remains between the housing 4 of the control system 3 and the motor 1. Inserted into the air interspace is a cooling ventilator 7 for the control system 3 and motor 1, the drive 8 of which ventilator projects axially into the housing 4 of the control system 3 and is connected there to suspension elements 9 in a manner known per se. The housing 4 has axially directed internal walls 10 which are joined in a thermally conductive fashion to the outer walls of the housing 4 and on which power transistors 11 indicated in FIG. 1 are mounted in a thermally dissipating fashion. In this arrangement, the cooling ventilator 7 can suck air through the control system 3 and below it into or against the motor 1.

FIG. 1 illustrates printed circuit boards 12 on which processors and other components, which are not critical with regard to their generation of heat, are arranged.

The supply voltage and data from a central control system 20 are fed to the control system 3 via a common cable 13. An input device 21 is connected to cable 13. The transmission of the driving current generated by the power transistors 11 to the motor 1 is performed via a short connecting cable 14.

Provided upstream of the ventilator 7 are funnel-shaped guide walls 25 of the housing 4, which ensure that the cooling air is blown off radially.

In the embodiment of the ventilator 2, the cooling ventilator 7' is not situated in the air gap 6 between the motor 1 and the housing 4 of the control system 3, but beyond the end wall, averted from the motor 1, of the housing 4 of the control system 3, although also on an axial arrangement with its axis of rotation parallel to the longitudinal axis of the casing of the motor 1 and the housing 4 of the control system 3. Accordingly, the power transistors 11 are mounted directly on the end wall of the housing 4 on which the ventilator 7' blows.

Figure 2:
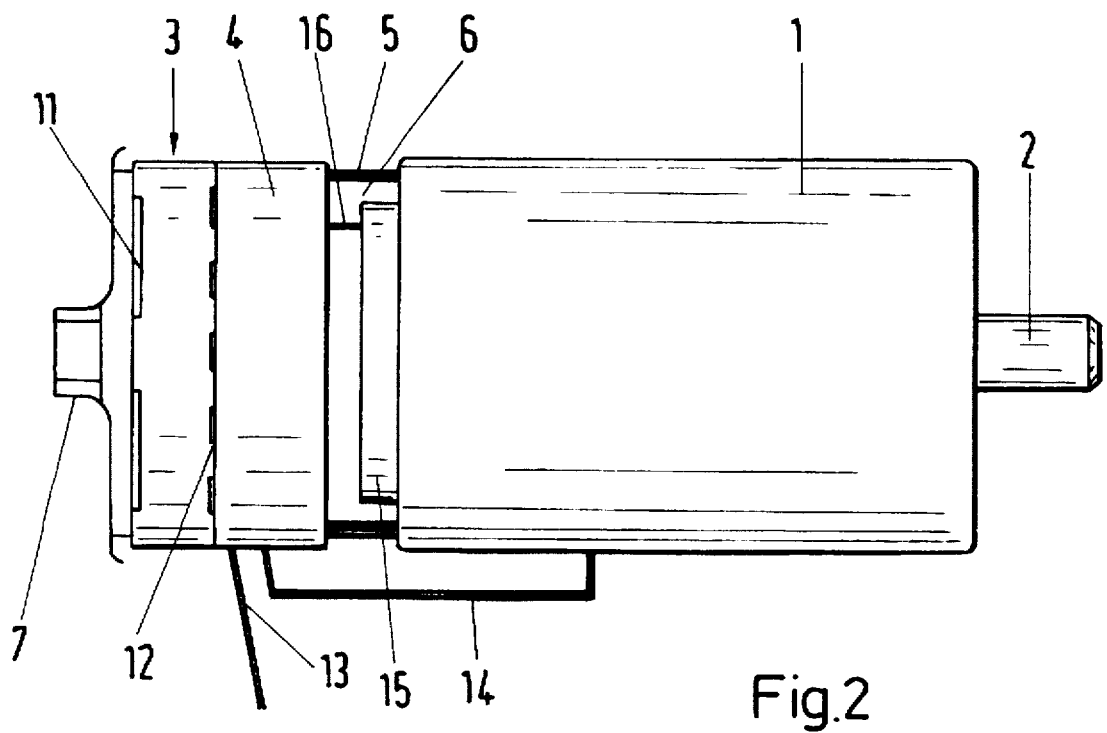
FIG. 2 shows a side view of a motor having a casing attached over an air interspace and a cooling ventilator on the side of the housing of the control system averted from the motor.

FIG. 2 further illustrates a rotor position sensor 15 projecting into the air gap 6, and a signal cable 16 between the motor 1 and control system 3, via which status information of the motor 1, for example the output signal of a temperature sensor for the motor windings, can be transmitted to the control system 3. This information can be related, as the case may be, to the central control system via the line 13.

Figure 3:
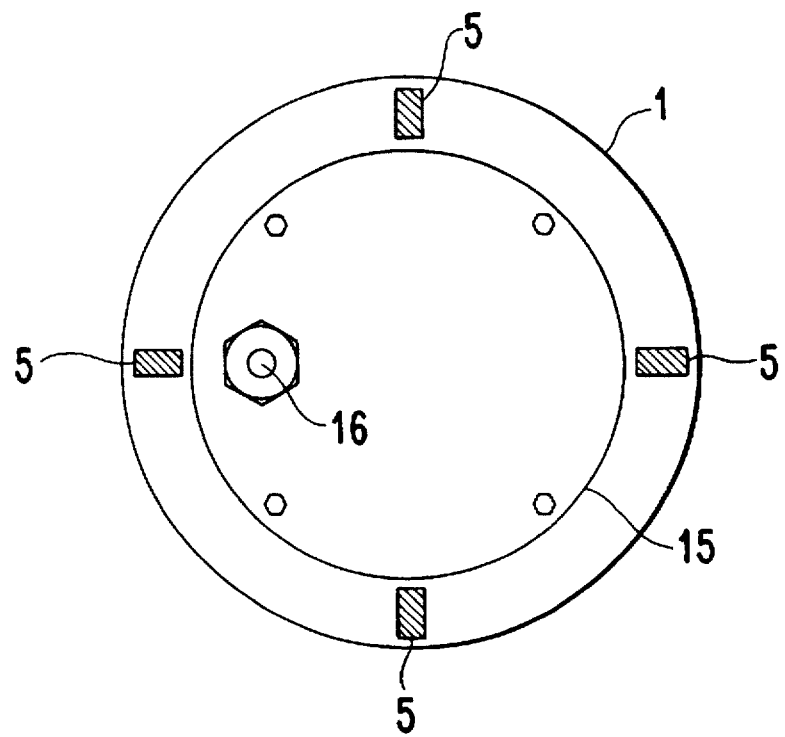
FIG. 3 shows a view of the vertical section through the air interspace shown in FIGS. 1 and 2.

FIG. 3 shows a vertical section through the air gap 6 with the arrangement of webs 5 which connect casing 1 and sensor 15.

It is understood that the foregoing description is that of the preferred embodiments of the invention and that various changes and modifications may be made thereto without departing from the spirit and scope of the invention as defined in the appended claims.

What is claimed is:

1. A motor control system, comprising:
    a controlled motor having an essentially cylindrical casing; and
    a control system having at least a processor and power control elements, said control system generating a driving current for the motor based on an external command signal fed to the control system, transmitting said driving current to the motor via a line, and receiving signals which indicate status of the motor,
    wherein said control system is mounted directly on a housing, said housing being connected to said casing by narrow webs bridging an air interspace formed between said casing of said motor and said housing of said control system, thereby mitigating mechanical and thermal influences of said casing of said motor and said housing, and wherein said control system has an input arrangement, comprising at least one input, for receiving the external command signal and a supply voltage for the generation of said driving current.

2. The motor control system according to claim 1, wherein a data line of a master control system is connected to said input arrangement.

3. The motor control system according to claim 1, wherein a manual input device is connected to the input arrangement.

4. The motor control system according to claim 3, wherein information on the status of the motor can be read off on the input device.

5. The motor control system according to claim 2, wherein a lead provided for the supply voltage for generating the driving current is connected to one input of the input arrangement and simultaneously serves as the data line.

6. The motor control system according to claim 1, wherein the motor has a cooling ventilator and the housing has ventilation openings communicating with the cooling ventilator.

7. The motor control system according to claim 6, wherein the cooling ventilator is arranged in the air interspace.

8. The motor control system according to claim 1, wherein the power control elements are mounted on a thermally conductive wall of the housing of the control system which is not adjacent to the cylindrical casing of the motor.

9. The motor control system according to claim 6, wherein the cooling ventilator is arranged with its axis of rotation parallel to the longitudinal axis of the cylindrical casing and the housing.

10. The motor control system according to claim 6, wherein a cooling ventilator is arranged on the side of the housing of the control system averted from the motor, and the power control elements are mounted on the wall adjacent to the cooling ventilator.

11. The motor control system according to claim 6, wherein the speed of the cooling ventilator can be controlled by the processor of the control system as a function of the power input of the motor.

12. The motor control system according to claim 11, wherein the processor can be fed an output signal of a temperature sensor for the motor.

13. A motor control system comprising:

a controlled motor having a cylindrical casing wherein the cylindrical casing comprises an end face and outer periphery;

a control system mounted on a housing and having at least a processor and a power control element, said control system generating a driving current for the controlled motor based on an external command signal fed to the control system, transmitting said driving current through the controlled motor via a line, and receiving signals which indicate status of the controlled motor; and a plurality of webs formed between the housing and the end face of the cylindrical casing such that an air interspace is present between the housing and the cylindrical casing wherein the plurality of webs mechanically decouple and thermally insulate the housing from the cylindrical casing;

wherein said control system has an input arrangement, comprising at least one input, for receiving the external command signal and a supply voltage for the generation of said driving current.

14. The motor control system according to claim 13, wherein the plurality of webs are periodically positioned in a circular arrangement around an entire circumference of the cylindrical casing and between the housing and the end face of the cylindrical casing.

15. The motor control system according to claim 6, wherein the cooling ventilator simultaneously cools the controlled motor and the control system.

16. The motor control system according to claim 13, wherein the plurality of webs are positioned on the outer periphery of the cylindrical casing in a ring fashion.

* * * * *